US012760225B2

(12) United States Patent
Guggilla et al.

(10) Patent No.: US 12,760,225 B2
(45) Date of Patent: Oct. 13, 2026

(54) SYSTEMS AND METHODS OF VALORIZATION OF MIXED WASTE PLASTIC OIL TO LIGHT OLEFINS VIA A CATALYTIC CRACKING PROCESS ALONG WITH NAPHTHA AS A CO-FEED/BLEND

(71) Applicant: SABIC Global Technologies B.V., Bergen OP Zoom (NL)

(72) Inventors: Vidya Sagar Guggilla, Bangalore (IN); Rajitha Vuppula, Bangalore (IN); Malvi Bharmana, Bangalore (IN); Christoph Dittrich, Geleen (NL); B. V. Venugopal, Bangalore (IN); Ahmed S. Al-Zenaidi, Riyadh (SA)

(73) Assignee: SABIC Global Technologies B.V., Bergen OP Zoom (NL)

( * ) Notice: Subject to any disclaimer, the term of this patent is extended or adjusted under 35 U.S.C. 154(b) by 241 days.

(21) Appl. No.: 18/718,327

(22) PCT Filed: Dec. 15, 2022

(86) PCT No.: PCT/IB2022/062321
§ 371 (c)(1),
(2) Date: Jun. 10, 2024

(87) PCT Pub. No.: WO2023/111951
PCT Pub. Date: Jun. 22, 2023

(65) Prior Publication Data

US 2025/0051664 A1 Feb. 13, 2025

Related U.S. Application Data

(60) Provisional application No. 63/265,415, filed on Dec. 15, 2021, provisional application No. 63/265,420, filed on Dec. 15, 2021.

(51) Int. Cl.
*B01J 29/40* (2006.01)
*B01J 35/40* (2024.01)
(Continued)

(52) U.S. Cl.
CPC .............. *C10G 1/002* (2013.01); *B01J 29/40* (2013.01); *B01J 35/40* (2024.01); *C10G 1/10* (2013.01);
(Continued)

(58) Field of Classification Search
CPC ........ C10G 1/002; C10G 1/10; C10G 11/187; C10G 55/06; C10G 69/04; C10G 2300/10;
(Continued)

(56) References Cited

U.S. PATENT DOCUMENTS 5,006,497 A 4/1991 Herbst
5,364,995 A 11/1994 Kirkwood
(Continued)

FOREIGN PATENT DOCUMENTS

CN 100569371 C 12/2009
EP 3484980 A1 5/2019
(Continued)

OTHER PUBLICATIONS

International Search Report for international application No. PCT/IB2022/062321, mailed on Mar. 24, 2023.
(Continued)

*Primary Examiner* — Ellen M Mcavoy
*Assistant Examiner* — Chantel Graham
(74) *Attorney, Agent, or Firm* — Womble Bond Dickinson (US) LLP

(57) ABSTRACT

The disclosure provides processes and systems for fluid catalytic cracking of feed streams including hydrocarbons and varying amounts of mixed waste plastic oil to produce
(Continued)

valuable petroleum products, such as light olefins and aromatics. The processes generally include providing a waste plastic pyrolysis oil, treating the waste pyrolysis oil reduce a content of one or more of silicon, chlorine, nitrogen, sulfur, and higher olefin components, providing a hydrocarbon stream, combining the hydrocarbon stream with the waste plastic pyrolysis oil to provide a combined feed stream, and feeding the combined feed stream to a fluid catalytic cracking unit having a catalytic cracking catalyst containing a mixture of HZSM-5 and USY.

20 Claims, 4 Drawing Sheets

(51) Int. Cl.

| | |
|---|---|
| ***C10G 1/00*** | (2006.01) |
| ***C10G 1/10*** | (2006.01) |
| ***C10G 11/18*** | (2006.01) |
| ***C10G 55/06*** | (2006.01) |
| ***C10G 69/04*** | (2006.01) |

(52) U.S. Cl.

CPC ............ *C10G 11/187* (2013.01); *C10G 55/06* (2013.01); *C10G 69/04* (2013.01); *B01J 2229/18* (2013.01); *C10G 2300/10* (2013.01); *C10G 2300/1003* (2013.01); *C10G 2300/1044* (2013.01); *C10G 2300/201* (2013.01); *C10G 2300/301* (2013.01); *C10G 2300/4006* (2013.01); *C10G 2300/4025* (2013.01); *C10G 2300/70* (2013.01); *C10G 2300/807* (2013.01); *C10G 2400/20* (2013.01); *C10G 2400/30* (2013.01)

(58) Field of Classification Search

CPC .... C10G 2300/1003; C10G 2300/1044; C10G 2300/201; C10G 2300/301; C10G 2300/4006; C10G 2300/4025; C10G 2300/70; C10G 2300/807; C10G 2400/20; C10G 2400/30; C10G 3/57; C10G 9/36; C10G 11/182; C10G 45/08; C10G 2300/104; C10G 25/00; B01J 29/40; B01J 35/40; B01J 2229/18; C10B 53/07

See application file for complete search history.

(56) References Cited

U.S. PATENT DOCUMENTS

| | | | |
|---|---|---|---|
| 8,685,232 | B2 | 4/2014 | Mandal |
| 2016/0264885 | A1 | 9/2016 | Narayanaswamy |
| 2020/0071623 | A1 | 3/2020 | Chinthala |
| 2020/0369966 | A1 | 11/2020 | Bitting |
| 2021/0130262 | A1 | 5/2021 | Wu |

FOREIGN PATENT DOCUMENTS

| | | | |
|---|---|---|---|
| WO | 2020/152319 | 7/2020 | |
| WO | 2020/242912 | 5/2021 | |
| WO | 2021/087062 | 5/2021 | |
| WO | 2021/105326 | 6/2021 | |
| WO | 2021/204821 | 10/2021 | |
| WO | WO-2021204821 A1 * | 10/2021 | ............. C10G 69/10 |

OTHER PUBLICATIONS

Arandes et al: "Effect of HZSM-5 catalyst addition on the cracking of polyolefin pyrolysis waxes under FCC conditions", Chemical Engeneering Journal, Elsevier, Amsterdam, NL, vol. 132, No. 1-3, Jun. 7, 2007 ( Jun. 7, 2007), pp. 17-26.

Awayssa O et al: "Modified HZSM-5 as FCC additive for enhancing light olefins yield from catalytic cracking of VGO", Applied Catalysis A: General, Elsevier, Amsterdam, Nl, vol. 477, Mar. 25, 2014 (Mar. 25, 2014), pp. 172-183.

J. Aguado et al: "Fuels from Waste Plastics by Thermal and Catalytic Processes: A Review", Industrial & Engineering Chemistry Research, vol. 47, No. 21, Nov. 5, 2008 (Nov. 5, 2008), pp. 7982-7992.

Hajekova et al. "Copyrolysis of naphtha with polyalkene cracking products; the influence of polyalkene mixtures composition on product distribution", J. Anal. Appl. Pyrolysis 79 (2007) 196-204.

Mlynkova et al., "Copyrolysis of oils/waxes of individual and mixed polyalkenes cracking products with petroleum fraction", Fuel Processing Technology 89 (2008) 1047-1055.

Hajekova et al. "Recycling of low-density polyethylene and polypropylene via copyrolysis of polyalkene oil/waxes with naphtha: product distribution and coke formation", J. Anal. Appl. Pyrolysis 74 (2005) 270-281.

Kusenberg et al., "Mixed plastic waste to olefins: From sorting, over impurities to product yields and coke formation (Conference Paper)", 2020 AIChE Virtual Spring Meeting and 16th Global Congress on Process Safety, Aug. 17, 2020 through Aug. 21, 2020.

* cited by examiner

SYSTEMS AND METHODS OF VALORIZATION OF MIXED WASTE PLASTIC OIL TO LIGHT OLEFINS VIA A CATALYTIC CRACKING PROCESS ALONG WITH NAPHTHA AS A CO-FEED/BLEND

CROSS-REFERENCE TO RELATED APPLICATIONS

This application is a U.S. National Phase Under 35 U.S.C. § 371 of International Application No. PCT/IB2022/062321, titled "SYSTEMS AND METHODS OF VALORIZATION OF MIXED WASTE PLASTIC OIL TO LIGHT OLEFINS VIA A CATALYTIC CRACKING PROCESS ALONG WITH NAPHTHA AS A CO-FEED/BLEND," filed Dec. 15, 2022, which claims the benefit of and priority to U.S. Provisional Application No. 63/265,420, filed on Dec. 15, 2021, and U.S. Provisional Application No. 63/265,415, filed on Dec. 15, 2021, which are each incorporated herein by reference in their entireties.

TECHNICAL FIELD

The present disclosure generally relates to a process for producing light olefins from a feedstock containing mixed waste plastic pyrolysis oil and hydrocarbons using a catalytic cracking process.

BACKGROUND

Globally, the production of plastic has increased steadily in the last decades. Recycling routes are an option to minimize plastic waste, while producing valuable petroleum products. However, the use of 100% mixed waste plastic pyrolysis oil in catalytic cracking processes has limitations due to high amounts of coke formation in the feed nozzles during preheating of the feed. Further, the formation of heavier products (e.g., fuel oil and tar) is high with mixed plastic waste oil as a cracker feed. Integration of waste mixed plastic pyrolysis oils into refinery fluid catalytic cracking unit feed streams has been previously investigated. Catalytic cracking of a pyrolysis oil derived from biomass-containing material has also been previously investigated. However, the majority of products produced by such processes include less valuable naphtha range components, such as products having five or more carbon atoms (C5+ products).

SUMMARY

It is presently recognized that different process conditions, different equipment, and/or changes in the cracking catalyst or catalyst composition may be made to achieve more valuable, light olefin yields for mixed waste plastic oil blended feeds, which are comparable to yields for vacuum gas oil or hydrotreated light oil feeds. Further, the major products produced in such integrated processes are restricted to naphtha range components (i.e., C5+ products). It is presently recognized that there is a demand for processes for producing light olefins from naphtha/waste plastic oil blends.

Provided herein are embodiments of processes for producing light olefins and aromatics from a feed stream. Embodiments of the processes generally include catalytic cracking of a feed stream having mixed waste plastic pyrolysis oil and hydrocarbons.

Accordingly, certain embodiments include a process for producing light olefins and aromatics that includes providing a waste plastic pyrolysis oil having a boiling point ranging from about 80° C. to about 450° C., passing the waste plastic pyrolysis oil through a guard bed configured to adsorb one or more of arsenic, lead, vanadium, silicon, chlorine, bromine, and fluorine components present in the waste plastic pyrolysis oil, preheating the waste plastic pyrolysis oil to a temperature of about 120° C. or less, providing a hydrocarbon stream having a boiling point ranging from about 30° C. to about 250° C., combining the hydrocarbon stream with the preheated waste plastic pyrolysis oil to produce a combined feed stream, which includes the waste plastic pyrolysis oil ranging from about 500 parts per million (ppm) to about 5% by weight. The method further includes the step of feeding the combined feed stream to a fluid catalytic cracking unit containing a catalytic cracking catalyst to yield a hydrocarbon product stream including a mixture of light olefins and aromatics. The catalytic cracking catalyst includes a mixture of the protonic type (H form) of Zeolite Socony Mobil-5 (HZSM-5) and ultra-stable Y zeolite (USY).

In some embodiments, the mixture of light olefins may include C1-C4 gases and C5+ liquid hydrocarbons. In some embodiments, the ratio of HZSM-5 and USY in the catalytic cracking catalyst may range from about 0.25 to about 10, from about 0.25 to about 5, or from about 1.5 to about 5. The HZSM-5 can have a silica-to-alumina ratio ranging from about 27 to about 50. In some embodiments, the HZSM-5 can have a silica-to-alumina ratio of about 30.

In some embodiments, the HZSM-5 may be phosphorus modified. In some embodiments, the HZSM-5 may include about 5 wt. % of $P_2O_5$. In some embodiments, the catalytic cracking catalyst may further include clay and alumina. In some embodiments, the USY may further include one or more rare earth metals in a total amount by weight of up to about 5%. In some embodiments, the USY may have a silica-to-alumina ratio (SAR) ranging from about 5 to about 50. In some embodiments, the catalytic cracking catalyst may include cobalt and molybdenum on alumina.

In another aspect, the process for producing light olefins and aromatics includes the steps of providing a waste plastic pyrolysis oil having a boiling point ranging from about 80° C. to about 450° C., passing the waste plastic pyrolysis oil through a guard bed configured to adsorb one or more of arsenic, lead, vanadium, silicon, chlorine, bromine, and fluorine components present in the waste plastic pyrolysis oil, providing a hydrocarbon stream having a boiling point ranging from about 30° C. to about 250° C., and combining the hydrocarbon stream with the waste plastic pyrolysis oil to provide a combined feed stream, which includes the waste plastic pyrolysis oil ranging from about 500 ppm to about 2 wt. %. The method further includes the steps of preheating the combined feed stream in a heat exchanger to a temperature of about 400° C. or more and feeding the combined feed stream to a fluid catalytic cracking unit containing a catalytic cracking catalyst, which includes a mixture of HZSM-5 and USY, to yield a hydrocarbon product stream including a mixture of light olefins and aromatics.

In some embodiments, the mixture of light olefins may include C1-C4 gases and C5+ liquid hydrocarbons. In some embodiments, the ratio by weight of HZSM-5 to USY in the catalytic cracking catalyst may be from about 0.25 to about 10, from about 0.25 to about 5, or from about 1.5 to about 5. In some embodiments, the HZSM-5 may have a silica-to-alumina ratio ranging from about 27 to about 50. In some embodiments, the HZSM-5 may have a silica-to-alumina ratio of about 30. In some embodiments, the HZSM-5 may be phosphorus modified. In some embodiments, the HZSM-5 may include about 5 wt. % of $P_2O_5$. In some embodiments, the catalytic cracking catalyst may further include clay and alumina. In some embodiments, the USY may further include one or more rare earth metals in a total amount by weight of up to about 5%. In some embodiments, the USY may have a SAR ranging from about 5 to about 50. In some embodiments, the hydrotreating catalyst may include cobalt and molybdenum on alumina.

Embodiments of the processes for producing light olefins and aromatics also include a method with the steps of providing a waste plastic pyrolysis oil having a boiling point ranging from about 80° C. to about 450° C., hydrotreating the waste plastic pyrolysis oil in the presence of a catalyst to reduce a content of one or more of chlorine, fluorine, bromine, arsenic, lead, vanadium, silicon, nitrogen, sulfur, and higher olefin components present in the waste plastic pyrolysis oil, providing a hydrocarbon stream having a boiling point ranging from about 30° C. to about 250° C., and combining the hydrocarbon stream with the waste plastic pyrolysis oil to provide a combined feed stream, which includes the waste plastic pyrolysis oil ranging from about 500 ppm to about 10 wt. %. The method further includes the steps of preheating the combined feed stream in a heat exchanger to a temperature of about 400° C. or more, and feeding the combined feed stream to a fluid catalytic cracking unit containing a catalytic cracking catalyst, which includes a mixture of HZSM-5 and USY, to yield a hydrocarbon product stream including a mixture of light olefins and aromatics.

In some embodiments, the mixture of light olefins may include C1-C4 gases and C5+ liquid hydrocarbons. In some embodiments, the ratio by weight of HZSM-5 to USY in the catalytic cracking catalyst may be from about 0.25 to about 10, from about 0.25 to about 5, or from about 1.5 to about 5, and the HZSM-5 may have a silica-to-alumina ratio ranging from about 27 to about 50. In some embodiments, the HZSM-5 may have a silica-to-alumina ratio of about 30. In some embodiments, the HZSM-5 may be phosphorus modified. In some embodiments, the HZSM-5 may include about 5 wt. % of $P_2O_5$. In some embodiments, the catalytic cracking catalyst may further include clay and alumina. In some embodiments, the USY may further include one or more rare earth metals in a total amount by weight of up to about 5%. In some embodiments, the USY may have a SAR ranging from about 5 to about 50. In some embodiments, the hydrotreating catalyst may include cobalt and molybdenum on alumina.

Embodiment of the processes for producing light olefins and aromatics also include a method with the steps of providing a waste plastic pyrolysis oil having a boiling point ranging from about 80° C. to about 450° C., passing the waste plastic pyrolysis oil through a guard bed configured to adsorb silicon components present in the waste plastic pyrolysis oil, hydrotreating the waste plastic pyrolysis oil in the presence of a catalyst to reduce amount of one or more of chlorine, nitrogen, sulfur, and higher olefin components present in the waste plastic pyrolysis oil, providing a hydrocarbon stream having a boiling point ranging from about 30° C. to about 250° C., and combining the hydrocarbon stream with the preheated waste plastic pyrolysis oil to provide a combined feed stream, which includes the waste plastic pyrolysis oil ranging from about 500 ppm to about 20 wt. %. The method further includes the steps of preheating the combined feed stream in a heat exchanger to a temperature of about 400° C. or more, and feeding the combined feed stream to a fluid catalytic cracking unit containing a catalytic cracking catalyst which includes a mixture of HZSM-5 and USY, to yield a hydrocarbon product stream including a mixture of light olefins and aromatics.

In some embodiments, the mixture of light olefins can include C1-C4 gases and C5+ liquid hydrocarbons. In some embodiments, the ratio by weight of HZSM-5 to USY in the catalytic cracking catalyst may be from about 0.25 to about 10, from about 0.25 to about 5, or from about 1.5 to about 5. In some embodiments, the HZSM-5 may have a silica-to-alumina ratio ranging from about 27 to about 50. In some embodiments, the HZSM-5 may have a silica-to-alumina ratio of about 30. In some embodiments, the HZSM-5 may be phosphorus modified. In some embodiments, the HZSM-5 may include about 5 wt. % of $P_2O_5$. In some embodiments, the catalytic cracking catalyst may further include clay and alumina. In some embodiments, the USY may further include one or more rare earth metals in a total amount by weight of up to about 5%. In some embodiments, the USY may have a SAR ranging from about 5 to about 50. In some embodiments, the hydrotreating catalyst may include cobalt and molybdenum on alumina.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

BRIEF DESCRIPTION OF THE DRAWINGS

Having thus described aspects of the disclosure in the foregoing general terms, reference will now be made to the accompanying drawings, which are not necessarily drawn to scale. The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced.

Figure 1:
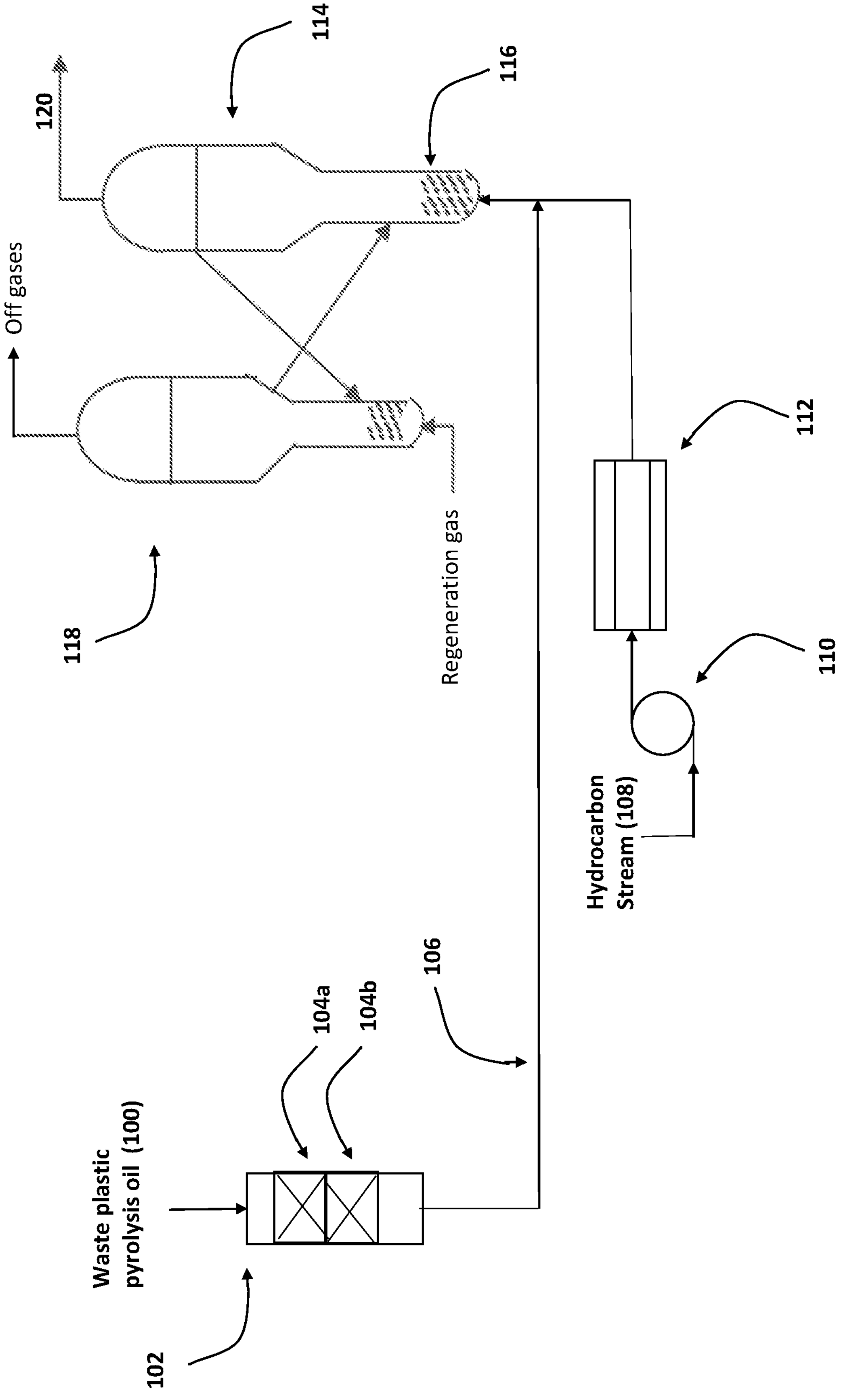

FIG. 1 shows a schematic diagram of a system suitable for producing light olefins utilizing a process according to an embodiment of the disclosure.

Figure 2:
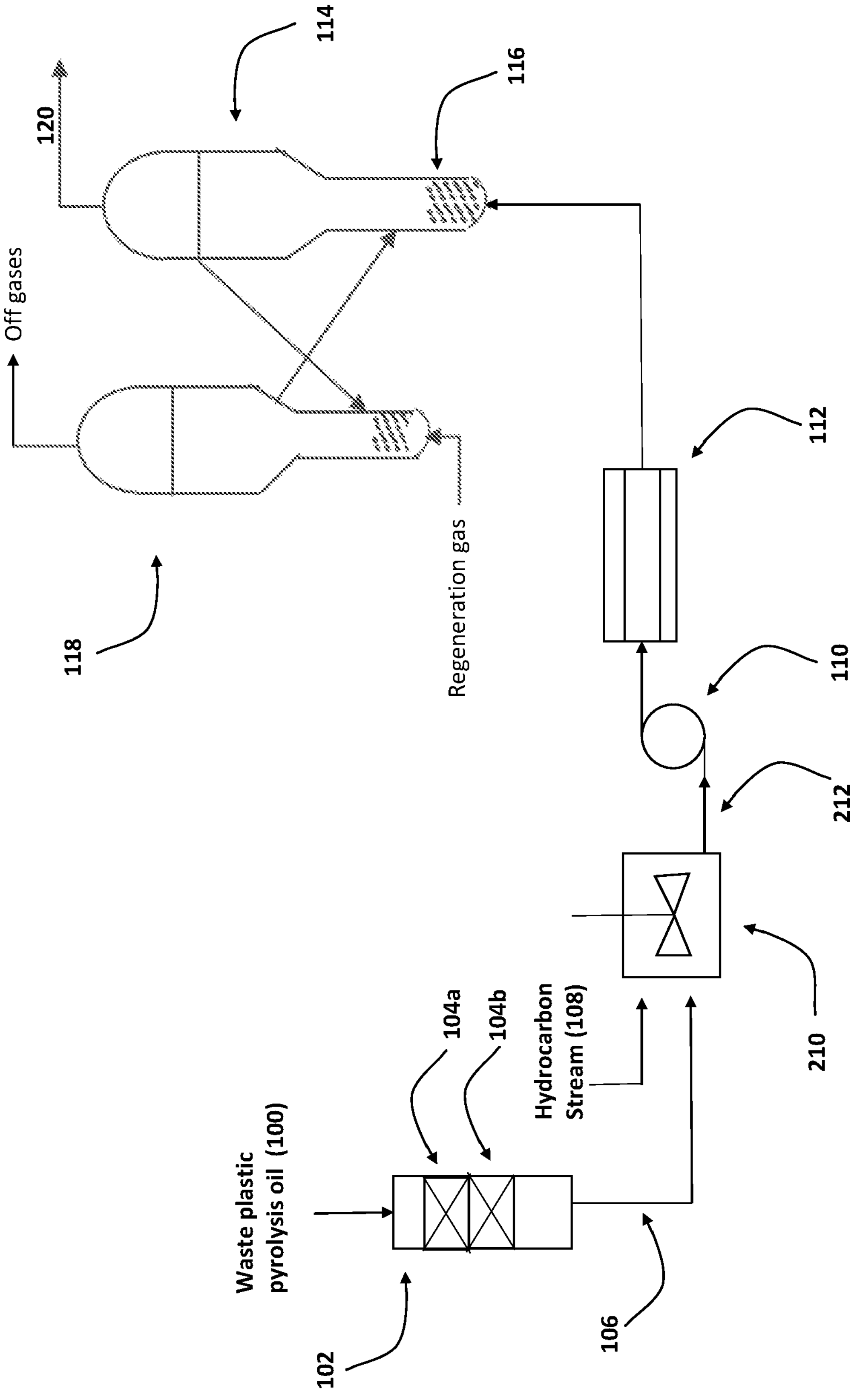

FIG. 2 shows a schematic diagram of another system suitable for producing light olefins utilizing a process according to an embodiment of the disclosure.

Figure 3:
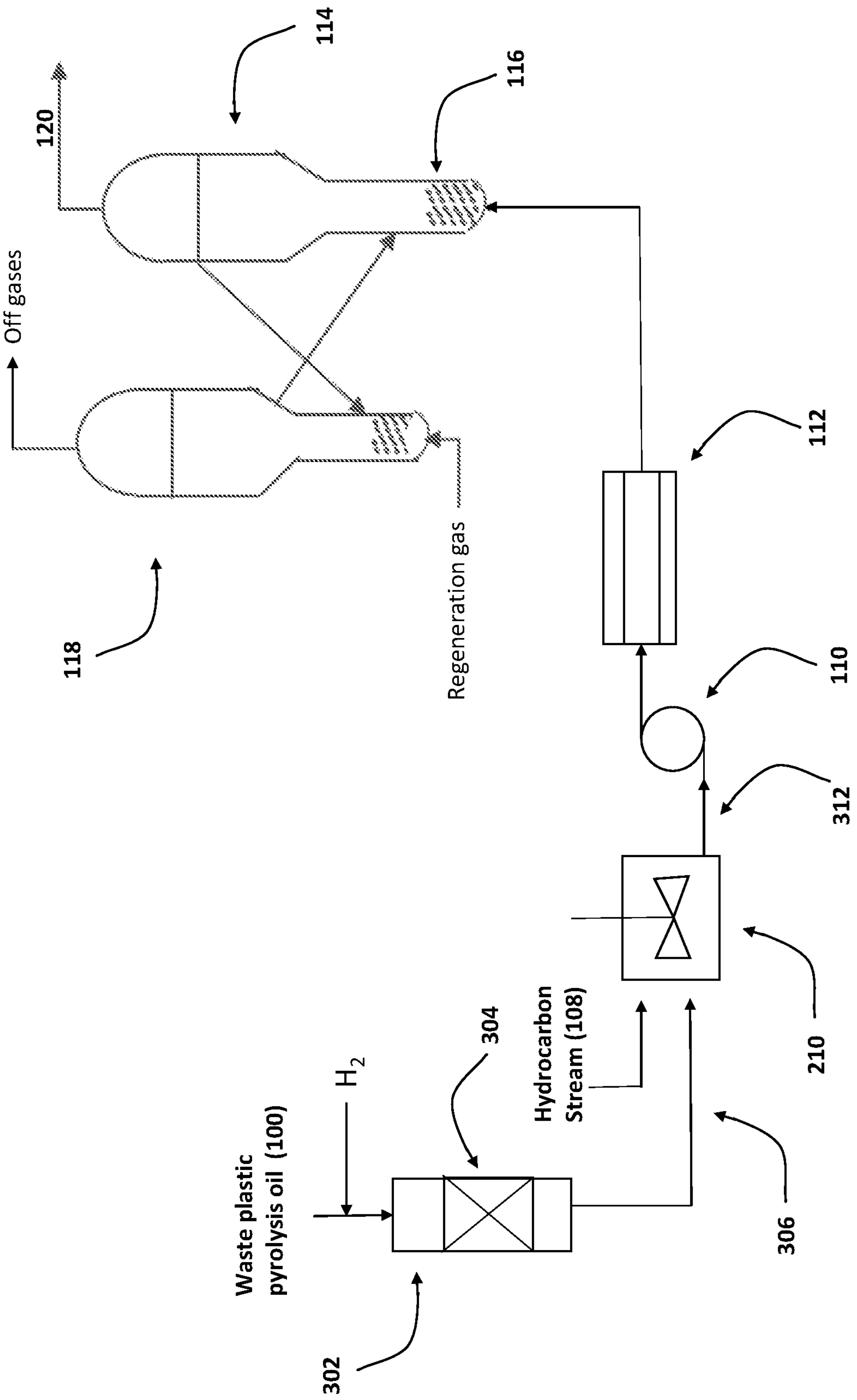

FIG. 3 shows a schematic diagram of yet another system suitable for producing light olefins utilizing a process according to an embodiment of the disclosure.

Figure 4:
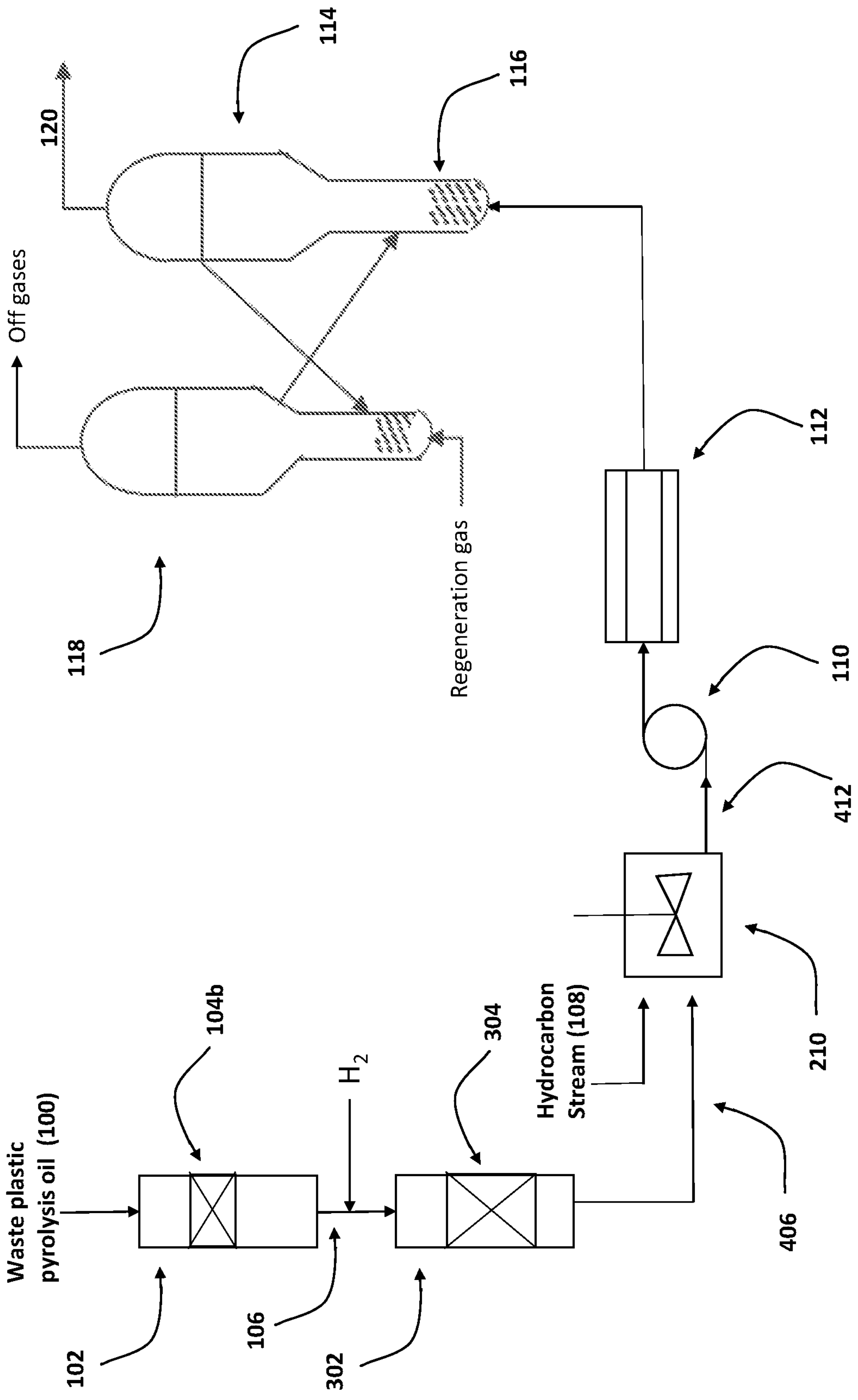

FIG. 4 shows a schematic diagram of a further system suitable for producing light olefins utilizing a process according to an embodiment of the disclosure.

DETAILED DESCRIPTION

The present disclosure will now be described more fully hereinafter with reference to example embodiments thereof.

These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements.

Although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

The following includes definitions of various terms and phrases used throughout this specification.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The process of the present disclosure can "comprise," "consist essentially of," or "consist of" particular ingredients, components, compositions, etc., disclosed throughout the specification.

The terms "about" or "approximately" are defined as being close to as understood by one of ordinary skill in the art. In one non-limiting embodiment, the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The term "effective," as that term is used in the specification and/or claims, means adequate to accomplish a desired, expected, or intended result.

The present disclosure is directed to embodiments of systems and processes for producing light olefins from a feed stream including waste plastic pyrolysis oil and hydrocarbons under fluid catalytic cracking conditions. The processes generally include providing a waste plastic pyrolysis oil, providing a hydrocarbon stream, combining the hydrocarbon stream with the waste plastic pyrolysis oil to provide a combined feed stream, and feeding the combined feed stream to a fluid catalytic cracking unit containing a catalytic cracking catalyst to yield a hydrocarbon product stream including a mixture of light olefins.

The waste plastic pyrolysis oil may be, for example, an untreated ("raw") oil obtained from the thermal decomposition or pyrolysis of mixed plastic waste. The boiling range of suitable waste plastic pyrolysis oils may vary. For example, a suitable waste plastic pyrolysis oil may have a boiling point ranging from about 80° C. to about 450° C. The upper limit of the boiling point range may be referred to as a "final boiling point" or "FBP", meaning that substantially all (e.g., greater than about 95%) of the waste plastic pyrolysis oil is volatilized below or at that temperature. In some embodiments, the FBP is 450° C.

Suitable hydrocarbon streams may include, for example, paraffins and isomeric paraffins, olefins, and aromatics. The boiling range of suitable hydrocarbons may vary. For example, suitable hydrocarbons may have a boiling point ranging from about 30° C. to about 250° C. In some embodiments, the hydrocarbon stream is full range naphtha (FRN).

The amount of the waste pyrolysis oil present in the combined waste stream may vary. Generally, the amount of waste plastic pyrolysis oil is selected to provide acceptable quantities of coke production in heat exchangers and to maximize the yield of light olefins produced in the process. Suitable amounts of waste plastic pyrolysis oil in the combined feed stream range from about 500 ppm to about 20 wt. %, such as from about 0.5 wt. % to about 20 wt. %, depending on the composition of the waste plastic pyrolysis oil and the specific process conditions and reactor configuration, and are described further herein below.

The embodiments of disclosed processes yield a hydrocarbon product stream. The composition of the hydrocarbon product stream may vary depending on the feed components and cracking conditions, but generally includes a mixture of gaseous C1-C4 hydrocarbons, liquid C5 hydrocarbons, and liquid C5+ hydrocarbons. Gaseous C1-C4 hydrocarbons include olefins such as ethylene, propylene, and isomeric butylenes, as well as alkanes such as methane, ethane, propane, and the isomeric butanes (e.g., normal and isobutene). Liquid C5 and liquid C5+ hydrocarbons may include aromatics, such as benzene, toluene, and xylene. Generally, the processes disclosed herein provide high yields of ethylene and propylene from combined streams that include waste plastic pyrolysis oil and hydrocarbons (e.g., full range naphtha).

The processes may further include treating the waste plastic pyrolysis oil to remove or reduce one or more of higher olefin components, and one or more of arsenic, lead, vanadium, silicon, chlorine, bromine, and fluorine components, which may be present in the waste pyrolysis oil (e.g., by hydrotreating and/or passing through one or more guard beds), preheating the waste plastic pyrolysis oil, or the combined feed stream, or combinations thereof. These and other features of embodiments of the processes are further described herein below.

The processes as disclosed herein may be performed using any suitable catalytic cracking system. Schematic illustrations of such systems according to non-limiting embodiments are provided in FIGS. 1 to 4. Indeed, steps of the processes disclosed herein may be understood by one of ordinary skill in the art with reference to the corresponding system components of the schematic illustrations in FIGS. 1 to 4.

An embodiment of a process for producing light olefins and aromatics includes providing a waste plastic pyrolysis oil having a boiling point ranging from about 80° C. to about 450° C., passing the waste plastic pyrolysis oil through a guard bed configured to adsorb one or more of arsenic, lead, vanadium, silicon, chlorine, bromine, and fluorine components that may be present in the waste plastic pyrolysis oil, preheating the waste plastic pyrolysis oil to a temperature of about 120° C. or less, providing a hydrocarbon stream having a boiling point ranging from about 30° C. to about 250° C., and combining the hydrocarbon stream with the preheated waste plastic pyrolysis oil to provide a combined feed stream, which includes the waste plastic pyrolysis oil ranging from about 500 ppm to about 5 wt. %. This process further includes feeding the combined feed stream to a fluid catalytic cracking unit containing a catalytic cracking catalyst, which includes a mixture of HZSM-5 and USY, to yield a hydrocarbon product stream including a mixture of light olefins and aromatics.

A non-limiting embodiment of one suitable system for performing an embodiment of the process is provided in FIG. 1. With reference to FIG. 1, the process may include providing a waste plastic pyrolysis oil 100 and passing the waste plastic pyrolysis oil 100 through a dual guard bed 104*a/b* configured to adsorb chlorine components via a suitable first adsorbent (104*a*) and silicon components via a suitable second adsorbent (104*b*). Chlorine components and silicon components may be present in the waste plastic pyrolysis oil 100. For example, chlorine components, present as organic or inorganic chloride, may be present in the waste plastic pyrolysis oil 100 as a result of pyrolyzing waste plastics including chlorinated polymers such as polyvinyl chloride. It is generally desirable to remove such chlorine components prior to catalytic cracking. The dual guard bed 104*a/b* may be contained within an outer structure 102. Any suitable material for adsorption of chlorine and silicon components may be utilized within the dual guard bed 104*a/b*. Non-limiting examples of adsorbents to adsorb one or more of silicon, fluorine, bromine, phosphorus, or sulphur containing components include activated alumina, molecular sieves like 13X, activated carbon, carbon molecular sieves, and activated carbon. Non-limiting examples of chemical adsorbents to adsorb chlorine components include calcium oxide, magnesium oxide, zinc oxide, copper oxide, iron oxide promoted activated alumina, and mixed metal oxides. Non-limiting examples of adsorbents in a guard bed trap to adsorb one or more of silicon, arsenic, vanadium, and lead components include alumina oxide, silica gel, coconut shell derived activated carbon, coal derived activated carbon, molecular sieves like 13X, and alumina oxide.

In some embodiments, after passing through the dual guard bed 104*a/b*, the treated waste pyrolysis oil 106 contains about 50 ppm or less of chlorine components (e.g., chlorine or inorganic chlorides, such as HCl), such as about 45 ppm, about 40 ppm, about 30 ppm, about 20 ppm, about 15 ppm, about 10 ppm, about 9 ppm, about 8 ppm, about 7 ppm, about 6 ppm, about 5 ppm, about 4 ppm, about 3 ppm, about 2 ppm, about 1 ppm, about 0.1 ppm, about 0.01 ppm, about 0.001 ppm, or even about 0 ppm of chlorine components. In some embodiments, after passing through the dual guard bed 104*a/b*, the treated waste pyrolysis oil 106 contains about 100 ppm or less of each of the fluorine, bromine, arsenic, lead, silicon, or vanadium components.

The process disclosed herein may include preheating the treated waste plastic pyrolysis oil 106 to a temperature of about 120° C. or less, such as from about 20° C. to about 120° C. Advantageously, this configuration reduces or eliminates the need for high (e.g., greater than 400° C.) preheating temperatures; thus, reducing the potential for coke formation. The process may include providing a hydrocarbon stream 108 having a boiling point ranging from about 30° C. to about 250° C. In some embodiments, the hydrocarbon stream 108 is full range naphtha (FRN).

In some embodiments, the hydrocarbon stream 108 is delivered to a pump 110 configured to feed the hydrocarbon stream 108 to a reactor 114 of a fluid catalytic cracking unit. The fluid catalytic cracking unit has two components—the reactor 114 and a regenerator 118. In some embodiments, the hydrocarbon stream enters a heat exchanger 112 prior to feeding to the reactor 114.

The process can include combining the hydrocarbon stream 108 with the treated, and optionally preheated, waste plastic pyrolysis oil 106 to provide a combined feed stream. In this embodiment, treated waste plastic pyrolysis oil 106 is directly injected and/or blended along with the hydrocarbon stream 108 near a feed nozzle of the reactor 114. The amount of treated waste pyrolysis oil 106 in the combined feed stream may vary. In some embodiments, the combined feed stream includes from about 500 ppm to about 5 wt. % of the treated waste plastic pyrolysis oil 106, such as about 0.5 wt. %, about 1 wt. %, about 2 wt. %, about 3 wt. %, about 4 wt. %, or about 4.5 wt. % of the treated waste plastic pyrolysis oil 106.

The process can include feeding the combined feed stream to the reactor 114 of the fluid catalytic cracking unit containing a catalytic cracking catalyst 116. The catalytic cracking catalyst 116 of the fluid catalytic cracking unit can include a mixture of zeolites HZSM-5 and USY. The ratio of the two zeolites by weight may vary. For example, in some embodiments, the ratio by weight of HZSM-5 to USY ranges from about 0.25 to about 10, such as from about 0.25 to about 5, or from about 1.5 to about 5. In some embodiments, the weight ratio is about 0.25, about 0.5, about 1, about 1.5, about 2, about 2.5, about 3, about 3.5, about 4, about 4.5, about 5, about 5.5, about 6, about 6.5, about 7, about 7.5, about 8, about 8.5, or about 9. In some embodiments, the HZSM-5 is phosphorus modified. In some embodiments, the HSZM-5 includes about 5 wt. % of $P_2O_5$. The molar silica-to-alumina ratio (SAR) of the HZSM-5 may vary. In some embodiments, the HZSM-5 has a SAR ranging from about 27 to about 50. In some embodiments, the HZSM-5 has a SAR of about 30. In some embodiments, the HSZM-5 includes about 5 wt. % of $P_2O_5$ and has a SAR ranging from about 27 to about 50. In some embodiments, the catalytic cracking catalyst further includes clay and alumina. In some embodiments, the USY further includes one or more rare earth metals in a total amount by weight of up to about 5%. In some embodiments, the USY has a molar SAR ranging from about 5 to about 50.

The temperature at which the reactor 114 is operated may vary. In some embodiments, the reactor 114 is operated at a reaction temperature between about 600° C. and about 700° C. In some embodiments, the reactor 114 is operated at a reaction temperature of about 600° C. In some embodiments, the reactor 114 is operated at a reaction temperature of about 650° C. Based on this operation, the disclosed process yields a hydrocarbon product stream 120 as described herein.

In some embodiments, the process may further include feeding a portion of the catalyst 116 to a regenerator 118, along with regeneration gas, to regenerate the catalyst 116. The regenerated catalyst is then fed back to reactor 114 for further use.

In another aspect, the process for producing light olefins and aromatics includes providing a waste plastic pyrolysis oil having a boiling point ranging from about 80° C. to about 450° C., passing the waste plastic pyrolysis oil through a guard bed configured to adsorb chlorine components and silicon components that may be present in the waste plastic pyrolysis oil, providing a hydrocarbon stream having a boiling point ranging from about 30° C. to about 250° C., combining the hydrocarbon stream with the waste plastic pyrolysis oil to provide a combined feed stream that includes the waste plastic pyrolysis oil ranging from about 500 ppm to about 2 wt. %, preheating the combined feed stream in a heat exchanger to a temperature of about 400° C. or more, and feeding the combined feed stream to a fluid catalytic cracking unit containing a catalytic cracking catalyst including a mixture of HZSM-5 and USY, to yield a hydrocarbon product stream including a mixture of light olefins and aromatics.

A non-limiting embodiment of one suitable system for performing the process is provided in FIG. 2. With reference to FIG. 2, the process may include providing a waste plastic pyrolysis oil 100, and passing the waste plastic pyrolysis oil 100 through a dual guard bed 104*a/b* configured to adsorb chlorine components via a suitable first adsorbent (104*a*) and silicon components via a suitable second adsorbent (104*b*). Chlorine components and silicon components may be present in the waste plastic pyrolysis oil 100. For example, chlorine components, present as organic or inorganic chloride, may be present in the waste plastic pyrolysis oil 100 as a result of pyrolyzing waste plastics including chlorinated polymers such as polyvinyl chloride. It is generally desirable to remove such chlorine components prior to catalytic cracking. The dual guard bed 104*a/b* may be contained within an outer structure 102. Any suitable material for adsorption of chlorine and silicon components may be utilized within the dual guard bed 104*a/b*. In some embodiments, after passing through the dual guard bed 104*a/b*, the treated waste pyrolysis oil 106 comprises about 50 ppm or less of chlorine components (e.g., chlorine or inorganic chloride, such as HCl), such as about 45 ppm, about 40 ppm, about 30 ppm, about 20 ppm, about 15 ppm, about 10 ppm, about 9 ppm, about 8 ppm, about 7 ppm, about 6 ppm, about 5 ppm, about 4 ppm, about 3 ppm, about 2 ppm, about 1 ppm, about 0.1 ppm, about 0.01 ppm, about 0.001 ppm, or even about 0 ppm of chlorine components.

The process disclosed herein may include providing a hydrocarbon stream 108 having a boiling point ranging from about 30° C. to about 250° C. In some embodiments, the hydrocarbon stream is full range naphtha (FRN).

The process may include combining the hydrocarbon stream 108 with the treated waste plastic pyrolysis oil 106 to provide a combined feed stream 212. The combining of the present embodiment is generally performed in a mixing apparatus 210. The mixing apparatus 210 may be a suitable unit or vessel for integrating, stirring, agitating, or otherwise combining the hydrocarbon stream 108 and the waste plastic pyrolysis oil 100 to provide the combined feed stream 212. The combined feed stream 212 includes a homogeneous mixture of the hydrocarbon stream 108 and the waste plastic pyrolysis oil 100, in certain embodiments.

The amount of waste pyrolysis oil in the combined feed stream 212 may vary. In some embodiments, the combined feed stream 212 includes from about 500 ppm to about 2 wt. % of the waste plastic pyrolysis oil 100, such as from about 0.5 to about 2 wt. % of the waste plastic pyrolysis oil 100. Notably, as the percent by weight of the waste plastic pyrolysis oil 100 in the combined feed stream 212 is increased, coke content in the heat exchanger increases, and yields of light olefins are decreased.

In some embodiments, the combined feed stream 212 is delivered to a pump 110 configured to feed the combined feed stream 212 to the reactor 114.

The process may include preheating the combined feed stream 212 to a temperature of about 400° C. or more, such as from about 400° C. to about 600° C. In some embodiments, the combined feed stream 212 enters a heat exchanger 112 configured to preheat the combined feed stream 212.

The process may include feeding the preheated combined feed stream 212 to a reactor 114 with a catalytic cracking catalyst 116, each as described herein above. The temperature at which the reactor 114 is operated may vary. In some embodiments, the reactor 114 is operated at a reaction temperature between about 600° C. and about 700° C. In some embodiments, the reactor 114 is operated at a reaction temperature of about 600° C. In some embodiments, the reactor 114 is operated at a reaction temperature of about 650° C. The disclosed process yields a hydrocarbon product stream 120 as described herein above. In some embodiments, the process may further include feeding a portion of the catalyst 116 to a regenerator 118, along with a regeneration gas, to regenerate the catalyst 116, which is then fed back to reactor 114.

In yet another aspect, the present disclosure provides an embodiment of a process for producing light olefins and aromatics that includes providing a waste plastic pyrolysis oil having a boiling point ranging from about 80° C. to about 450° C., hydrotreating the waste plastic pyrolysis oil in the presence of a catalyst to reduce a content of one or more of chlorine, nitrogen, sulfur, and higher olefin components that may be present in the waste plastic pyrolysis oil, providing a hydrocarbon stream having a boiling point ranging from about 30° C. to about 250° C., combining the hydrocarbon stream with the waste plastic pyrolysis oil to provide a combined feed stream that includes the waste plastic pyrolysis oil ranging from about 500 ppm to about 10 wt. %, preheating the combined feed stream in a heat exchanger to a temperature of about 400° C. or more, and feeding the combined feed stream to a reactor containing a catalytic cracking catalyst, which includes a mixture of HZSM-5 and USY, to yield a hydrocarbon product stream including a mixture of light olefins and aromatics.

A non-limiting embodiment of one suitable system for performing the process is provided in FIG. 3. With reference to FIG. 3, the process may include providing a waste plastic pyrolysis oil 100, and hydrotreating the waste plastic pyrolysis oil 100 in a hydrotreatment unit 302 to provide a hydrotreated waste plastic pyrolysis oil 306. The hydrotreating step can include contacting the waste plastic pyrolysis oil 100 with hydrogen gas in the presence of a hydrotreating catalyst 304 to reduce a content of one or more of chlorine, nitrogen, sulfur, and higher olefin components that may be present in the waste plastic pyrolysis oil. The hydrotreating catalyst 304 can be any suitable hydrotreating catalyst for hydrotreating the waste plastic pyrolysis oil 100. In some embodiments, the hydrotreating catalyst 304 includes cobalt and molybdenum on alumina. The process may include providing a hydrocarbon stream 108 having a boiling point ranging from about 30° C. to about 250° C. In some embodiments, the hydrocarbon stream 108 is full range naphtha (FRN).

The process can include combining the hydrocarbon stream 108 with the hydrotreated waste plastic pyrolysis oil 306 to provide a combined feed stream 312. In certain embodiments, combining the two streams is generally performed in a mixing apparatus 210.

The amount of waste pyrolysis oil in the combined feed stream 312 may vary. In some embodiments, the combined feed stream includes from about 500 ppm to about 10 wt. % of the waste plastic pyrolysis oil, such as about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, or about 9.5 wt. % of the waste plastic pyrolysis oil.

In some embodiments, the combined feed stream 312 is delivered to a pump 110 configured to feed the combined feed stream 312 to the reactor 114. The process can include preheating the combined feed stream 312 to a temperature of about 400° C. or more, such as from about 400° C. to about 600° C. In some embodiments, the combined feed stream 312 enters a heat exchanger 112 configured to preheat the combined feed stream 312.

The process can include feeding the preheated combined feed stream 312 to a reactor 114 containing a catalytic cracking catalyst 116, each as described herein above. The temperature at which the reactor 114 is operated may vary. In some embodiments, the reactor 114 is operated at a reaction temperature between about 600° C. and about 700° C. In some embodiments, the reactor 114 is operated at a reaction temperature of about 600° C. In some embodiments, the reactor 114 is operated at a reaction temperature of about 650° C. The disclosed process yields a hydrocarbon product stream 120 as described herein above. In some embodiments, the process can further include feeding a portion of the catalyst 116 to a regenerator 118, along with regeneration gas, to regenerate the catalyst 116, which is then fed back to reactor 114.

In a still further aspect, the disclosure provides an embodiment of a process for producing light olefins and aromatics that includes providing a waste plastic pyrolysis oil having a boiling point ranging from about 80° C. to about 450° C., passing the waste plastic pyrolysis oil through a guard bed configured to adsorb silicon components that may be present in the waste plastic pyrolysis oil, hydrotreating the waste plastic pyrolysis oil in the presence of a catalyst to reduce a content of one or more of chlorine, nitrogen, sulfur, and higher olefin components that may be present in the waste plastic pyrolysis oil, providing a hydrocarbon stream having a boiling point ranging from about 30° C. to about 250° C., combining the hydrocarbon stream with the preheated waste plastic pyrolysis oil to provide a combined feed stream including the waste plastic pyrolysis oil ranging from about 500 ppm to about 20 wt. %, preheating the combined feed stream in a heat exchanger to a temperature of about 400° C. or more, and feeding the combined feed stream to a fluid catalytic cracking unit containing a catalytic cracking catalyst including a mixture of HZSM-5 and USY, to yield a hydrocarbon product stream including a mixture of light olefins and aromatics.

A non-limiting embodiment of a suitable system for performing the process is provided in FIG. 4. With reference to FIG. 4, the process includes providing a waste plastic pyrolysis oil 100, and passing the waste plastic pyrolysis oil 100 through a guard bed **104*b* having a suitable adsorbent configured to adsorb silicon components that may be present in the waste plastic pyrolysis oil 100. The guard bed 104*b* may be contained within an outer structure 102**.

The process can include hydrotreating the treated waste plastic pyrolysis oil 106 in a hydrotreatment unit 302 to provide a hydrotreated waste plastic pyrolysis oil 406. The hydrotreating step can include contacting the waste plastic pyrolysis oil 100 with hydrogen gas in the presence of a hydrotreating catalyst 304 to reduce a content of one or more of chlorine, nitrogen, sulfur, and higher olefin components that may be present in the treated waste plastic pyrolysis oil 106. The process can include providing a hydrocarbon stream 108 having a boiling point ranging from about 30° C. to about 250° C. In some embodiments, the hydrocarbon stream is full range naphtha (FRN).

The process can include combining the hydrocarbon stream 108 with the hydrotreated waste plastic pyrolysis oil 406 to provide a combined feed stream 412. Combining the hydrocarbon stream 108 with the hydrotreated waste plastic pyrolysis oil 406 is generally performed in a mixing apparatus 210 in the illustrated embodiment. The amount of hydrotreated waste pyrolysis oil 406 in the combined feed stream 412 may vary. In some embodiments, the combined feed stream includes the hydrotreated waste plastic pyrolysis oil 406 in an amount by weight from about 500 ppm to about 20%, such as from about 0.5 to about 20, or from about 1, about 5, or about 10, to about 15, or about 20 wt. %. In some embodiments, the combined feed stream 412 is delivered to a pump 110 configured to feed the combined feed stream 412 to the reactor 114.

The process can include preheating the combined feed stream 412 to a temperature of about 400° C. or more, such as from about 400° C. to about 600° C. In some embodiments, the combined feed stream 412 enters a heat exchanger 112 configured to preheat the combined feed stream 412.

The process can include feeding the preheated combined feed stream 312 to a reactor 114 containing a catalytic cracking catalyst 116, each as described herein above. The temperature at which the reactor 114 is operated may vary. In some embodiments, the reactor 114 is operated at a reaction temperature between about 600° C. and about 700° C. In some embodiments, the reactor 114 is operated at a reaction temperature of about 600° C. In some embodiments, the reactor 114 is operated at a reaction temperature of about 650° C. The disclosed process yields a hydrocarbon product stream 120 as described herein above. In some embodiments, the process may further include feeding a portion of the catalyst 116 to a regenerator 118, along with the regeneration gas, to regenerate the catalyst 116, which is then fed back to reactor 114.

Various examples provided below illustrate selected aspects of the various methods of processing waste plastic pyrolysis oil.

EXAMPLES

The following examples are put forth so as to provide those of ordinary skill in the art with a complete disclosure and description of how the compounds, compositions, articles, devices and/or methods claimed herein are made and evaluated and, therefore, are intended to be purely exemplary and are not intended to limit the disclosure. Efforts have been made to ensure accuracy with respect to numbers (e.g., amounts, temperature, etc.), but some errors and deviations should be accounted for There are numerous variations and combinations of reaction conditions, for example, component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1. Catalytic Cracking of Full Range Naphtha and Mixed Waste Plastic Oil Blends to Light Olefins Over HZSM-5/USY 9 Catalyst Catalytic cracking of full range naphtha, mixed waste plastic oil (FBP: 450), and blends thereof to light olefins is performed over a variety of mixed HZSM-5/USY catalysts (weight ratios of HZSM-5 to USY from 1.5 to 9). The physical properties and chemical composition of the full range naphtha (FRN) and mixed waste plastic oil are provided in Table 1. The catalytic cracking is performed in a fixed bed micro reactor having an internal diameter of 12 mm at a reactor temperature of 600-650° C.

The mixed plastic oil can be utilized in the methods and systems described herein with and without pretreatment with a guard bed, and with or without hydrotreating (hydrogenation). When used, the hydrotreating catalyst is a commercial Co—Mo/Alumina based catalyst.

The gaseous products are measured volumetrically using wet gas flow meter and product compositions are analyzed by on-line gas chromatography. Condensed liquid products are weighed using an analytical balance, and product composition is analyzed by off-line gas chromatography.

TABLE 1

The physical properties of feed stocks

| Property | Unit | Full Range Naphtha (FRN) | Pyrolysis Oil |
|---|---|---|---|
| Density (20° C.) kg/m$^3$ | Kg/m$^3$ | 680 | 813 |
| Boiling Range | | | |
| Initial Boiling Point | ° C. | 30 | 80 |
| End Boiling Point (final boiling point; FBP) | ° C. | 200 | 450 |
| Chemical Composition | | | |
| Paraffins | wt. % | 30.9 | 17.7 |
| Iso-paraffins | wt. % | 39.5 | 15.2 |
| Olefins | wt. % | 1.3 | 26.1 |
| Naphthenes | wt. % | 24.6 | 32.1 |
| Aromatics | wt. % | 3.7 | 6.9 |
| Total Nitrogen | ppm | 5 | 3300 |
| Total Sulfur | ppm | 50 | 125 |
| Total Oxygen | ppm | 0 | 11600 |
| Total Chlorine | ppm | 0 | 1838 |

Other objects, features, and advantages of the disclosure will become apparent from the figures, detailed description, and examples. It should be understood, however, that the figures, detailed description, and examples, while indicating specific embodiments of the disclosure, are given by way of illustration only and are not meant to be limiting. Additionally, it is contemplated that changes and modifications within the spirit and scope of the disclosure will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

What is claimed is:

1. A process for producing light olefins and aromatics, the process comprising:

providing a waste plastic pyrolysis oil having a first boiling point ranging from about 80° C. to about 450° C.;

passing the waste plastic pyrolysis oil through a guard bed unit configured to adsorb one or more of chlorine, fluorine, bromine, arsenic, lead, vanadium, and silicon components when present in the waste plastic pyrolysis oil;

preheating the waste plastic pyrolysis oil to a temperature of about 120° C. or less;

providing a hydrocarbon stream having a second boiling point ranging from about 30° C. to about 250° C.;

combining the hydrocarbon stream with the preheated waste plastic pyrolysis oil to provide a combined feed stream, wherein the combined feed stream includes the waste plastic pyrolysis oil ranging from about 500 parts per million (ppm) to about 5% by weight; and feeding the combined feed stream to a fluid catalytic cracking unit with a catalytic cracking catalyst containing a mixture of HZSM-5 and USY to yield a hydrocarbon product stream with a mixture of light olefins and aromatics.

2. The process of claim 1, wherein the combined feed stream comprises a homogeneous mixture of the hydrocarbon stream and the waste plastic pyrolysis oil.

3. The process of claim 1, wherein the mixture of light olefins and aromatics comprises C1-C4 gases and C5+ liquid hydrocarbons, and wherein the guard bed unit comprises a first guard bed configured to adsorb chlorine components and second guard bed configured to adsorb silicon components when present in the waste plastic pyrolysis oil.

4. The process of claim 1, wherein the hydrocarbon stream comprises full range naphtha.

5. The process of claim 1, wherein a ratio by weight of HZSM-5 to USY in the catalytic cracking catalyst is from about 0.25 to about 10, and wherein the HZSM-5 has a molar silica-to-alumina ratio ranging from about 27 to about 50.

6. The process of claim 5, wherein the ratio by weight of HZSM-5 to USY in the catalytic cracking catalyst is from about 0.25 to about 5.

7. The process of claim 1, wherein the HZSM-5 is phosphorus modified to comprise about 5 wt. % of $P_2O_5$.

8. The process of claim 1, wherein the USY has a molar silica-to-alumina ratio ranging from about 5 to about 50.

9. A process for producing light olefins and aromatics, the process comprising:

providing a waste plastic pyrolysis oil having a first boiling point ranging from about 80° C. to about 450° C.;

passing the waste plastic pyrolysis oil through a guard bed configured to adsorb chlorine components, silicon components, or a combination thereof when present in the waste plastic pyrolysis oil;

providing a hydrocarbon stream having a second boiling point ranging from about 30° C. to about 250° C.;

combining the hydrocarbon stream with the waste plastic pyrolysis oil to provide a combined feed stream, wherein the combined feed stream includes the waste plastic pyrolysis oil ranging from about 500 ppm to about 2% by weight;

preheating the combined feed stream in a heat exchanger to a temperature of about 400° C. or more; and feeding the combined feed stream to a fluid catalytic cracking unit with a catalytic cracking catalyst containing a mixture of HZSM-5 and USY to yield a hydrocarbon product stream with a mixture of light olefins and aromatics.

10. The process of claim 9, wherein the mixture of light olefins and aromatics comprises C1-C4 gases and C5+ liquid hydrocarbons, and wherein the C1-C4 gases comprise ethylene and propylene.

11. The process of claim 9, wherein a ratio by weight of HZSM-5 to USY in the catalytic cracking catalyst is from about 0.25 to about 10.

12. The process of claim 9, wherein the HZSM-5 has a molar silica-to-alumina ratio ranging from about 27 to about 50, and wherein the USY has a molar silica-to-alumina ratio ranging from about 5 to about 50.

13. The process of claim 9, wherein the HZSM-5 is phosphorus modified to include about 5 wt. % of $P_2O_5$, and wherein the USY further comprises one or more rare earth metals in a total amount by weight of up to about 5%.

14. A process for producing light olefins and aromatics, the process comprising:

providing a waste plastic pyrolysis oil having a first boiling point ranging from about 80° C. to about 450° C.;

hydrotreating the waste plastic pyrolysis oil in the presence of a hydrotreating catalyst to reduce a content of one or more of chlorine, nitrogen, sulfur, and higher olefin components when be present in the waste plastic pyrolysis oil;

providing a hydrocarbon stream having a second boiling point ranging from about 30° C. to about 250° C.;

combining the hydrocarbon stream with the waste plastic pyrolysis oil to provide a combined feed stream, wherein the combined feed stream includes the waste plastic pyrolysis oil ranging from about 500 ppm to about 10% by weight;

preheating the combined feed stream in a heat exchanger to a temperature of about 400° C. or more; and feeding the combined feed stream to a fluid catalytic cracking unit with a catalytic cracking catalyst containing a mixture of HZSM-5 and USY to yield a hydrocarbon product stream with a mixture of light olefins and aromatics.

15. The process of claim 14, further comprising:

passing the waste plastic pyrolysis oil through a guard bed configured to adsorb silicon components when present in the waste plastic pyrolysis oil, and wherein the combined feed stream is exclusively fed to the fluid catalytic cracking unit.

16. The process of claim 14, wherein the hydrotreating catalyst comprises cobalt and molybdenum on alumina.

17. The process of claim 14, wherein the mixture of light olefins and aromatics comprises C1-C4 gases and C5+ liquid hydrocarbons.

18. The process of claim 14, wherein a ratio by weight of HZSM-5 to USY in the catalytic cracking catalyst is from about 0.25 to about 10, and wherein the HZSM-5 has a molar silica-to-alumina ratio ranging from about 27 to about 50.

19. The process of claim 18, wherein the ratio by weight of HZSM-5 to USY in the catalytic cracking catalyst is from about 0.25 to about 5.

20. The process of claim 14, wherein the USY further comprises one or more rare earth metals in a total amount by weight of up to about 5%.

* * * * *